(12) United States Patent
Statsyuk et al.

(10) Patent No.: US 12,517,113 B2
(45) Date of Patent: Jan. 6, 2026

(54) MULTIKINASE DEGRADERS

(71) Applicant: University of Houston System, Houston, TX (US)

(72) Inventors: Alexander Statsyuk, Houston, TX (US); Sandipan Roy Chowdhury, Houston, TX (US)

(73) Assignee: University of Houston System, Houston, TX (US)

( * ) Notice: Subject to any disclaimer, the term of this patent is extended or adjusted under 35 U.S.C. 154(b) by 1013 days.

(21) Appl. No.: 17/631,003

(22) PCT Filed: Jul. 28, 2020

(86) PCT No.: PCT/US2020/043855
§ 371 (c)(1),
(2) Date: Jan. 28, 2022

(87) PCT Pub. No.: WO2021/021797
PCT Pub. Date: Feb. 4, 2021

(65) Prior Publication Data
US 2022/0276226 A1 Sep. 1, 2022

Related U.S. Application Data

(60) Provisional application No. 62/880,700, filed on Jul. 31, 2019.

(51) Int. Cl.
*A61K 47/54* (2017.01)
*A61K 47/55* (2017.01)
*C07D 401/14* (2006.01)
*C07D 417/14* (2006.01)
*G01N 33/50* (2006.01)

(52) U.S. Cl.
CPC .......... *G01N 33/5011* (2013.01); *A61K 47/54* (2017.08); *A61K 47/545* (2017.08); *A61K 47/55* (2017.08); *C07D 401/14* (2013.01); *C07D 417/14* (2013.01)

(58) Field of Classification Search
CPC .. C07D 417/14; C07D 403/12; C07D 417/12; C07D 401/04; C07D 213/75; C07D 213/81; C07D 401/10; C12Q 1/6886; C12Q 2600/158; C12Y 503/03012; C12Y 603/04015
USPC .......................................................... 435/7.6
See application file for complete search history.

(56) References Cited

U.S. PATENT DOCUMENTS

2018/0353501 A1  12/2018  Crew et al.

FOREIGN PATENT DOCUMENTS

WO  2017/007612  1/2017
WO  2019/079701  4/2019

OTHER PUBLICATIONS

Qu, et al., "Discovery of PT-65 as a highly potent and selective Proteolysis-targeting chimera degrader of GSK3 for treating Alzheimer's disease", (2021), vol. 226, ISSNL 0223-5234; Jiangsu Key Laboratory of Bioactive Natural Product Research and State Key Laboratory of Natural Medicines, Department of Natural Medicinal Chemistry, School of Traditional Chinese Pharmacy, China Pharmaceutical University, 210009, China, 41 pages.
Aronov, et al., "Toward a Pharmacophore for Kinase Frequent Hitters", American Chemical Society, J. Med. Chem., 2004, 47, pp. 5616-5619.
Notification of Transmittal of the International Search Report and the Written Opinion of the International Search Authority—The European Patent Office—mailed Oct. 6, 2020 for PCT/US20/43855, 20 pages.
Ashton C. Lai, et al., "Modular PROTAC Design for the Degradation of Oncogenic BCR-ABL", Angewandte Chemie, vol. 55, No. 2, Jan. 11, 2016, 4 pages.
Carrie M. Gower, et al., "Conversion of a Single Polypharmacological Agent into Selective Bivalent Inhibitors of Intracellular Kinase Activity", ACS Chemical Biology, vol. 11, No. 1, Nov. 6, 2015, 11 pages.
Notification of Transmittal of the International Preliminary Report on Patentability mailed from the International Bureau pf WIPO on Feb. 10, 2022 for PCT/US20/43855, 13 pages.

*Primary Examiner* — Tekchand Saidha
*Assistant Examiner* — Mohammad Y Meah
(74) *Attorney, Agent, or Firm* — Jackson Walker LLP

(57) ABSTRACT

Multikinase degraders described herein contain on one end a Von Hippel-Lindau (VHL) E3 ligase ligand or cereblon E3 ligase recruiter moiety, which bind to the VHL or cereblon E3 ubiquitin ligase (defined as a ubiquitin ligand binding moiety or ULM group), respectively, and on the other end a promiscuous kinase ligand that binds a target protein kinase (defined as a protein/polypeptide targeting moiety or PTM group), such that the target protein is in close proximity to the ubiquitin ligase. This leads to the ubiquitination and subsequent degradation (and inhibition) of the target protein. Specific present multikinase degraders as shown bind about 360 out of 400 tested kinases, showing that they are much more general kinase binders and degraders than any previously reported.

6 Claims, 13 Drawing Sheets

Log(inhibitor) vs. response – Variable slope (four parameters)
Best-fit values
Bottom                    7.391
Top                       90.09
LogIC50                   -0.1144
HillSlope                 -1.295
IC50                      0.7683
Span                      82.7

MULTIKINASE DEGRADERS

This application claims priority to U.S. Provisional Patent Application Ser. No. 62/880,700, entitled "Multikinase Degraders," filed Jul. 31, 2019, the entire contents of which are hereby incorporated by reference.

This invention was made with government support under grant NIH RO1 GM115632 awarded by the National Institutes of Health. The government as certain rights in the invention.

BACKGROUND

This disclosure pertains to compounds that can degrade multiple kinases. Kinases are enzymes that phosphorylate and regulate proteins, producing a variety of biological effects. Kinases are validated drug targets and their degradation is useful to treat diseases related to misregulation of kinase activity including but not limited to cancers, autoinflammatory disorders, and neurodegenerative disorders. Compounds that degrade multiple kinases can be tested in cellular assays, and if there is an effect on the assay it is possible to identify the degradation of which kinase causes the observed effect. For example, such compounds can be tested in drug-resistant cells from cancer patients, and if any of the compounds is toxic it is highly likely that the observed toxicity is due to the degradation of protein kinases. Quantitative mass-spectrometry can be used to then determine the degradation of which kinase is toxic to the drug resistant cells. Subsequently, selective degraders of that kinase can be designed for drug discovery purposes. Multi-Kinase degraders may also be useful as drugs, if the degradation of multiple kinases is useful to achieve a pharmacological effect. For example, simultaneous inhibition of tyrosine kinases and lipid kinases was shown to be beneficial for cancer treatment (Nat Chem Biol. 2008 November; 4(11): 691-9).

SUMMARY

The present disclosure relates generally to multikinase degraders and in particular to multikinase degraders that are general in their ability to bind and degrade kinases.

The multikinase degraders described herein can be used as research tools to identify kinase drug targets in any cell-based assay. If there is an effect on the cell-based assay, it is due to the degradation of the kinase. Subsequently it is possible to determine degradation of which kinase causes the effect on the cell-based assay. Secondly, compounds can be used to quickly test if a particular ligase, such as E3, can degrade a particular kinase. There are 500 kinases and ~600 E3 ligases and matching functional pairs is a challenge. Compounds themselves can be used as drugs to treat cancer and for immunooncology applications if multikinase degradation is needed for a therapeutic effect. For example, this may include degraders of CHK1, CHK2 kinases.

Promiscuous kinase binder warheads have been disclosed previously. However, these warheads are less general than the multikinase binder warheads described herein. The multikinase binder warheads described herein are based on a rationally designed compound that has a pharmacophore of a frequent kinase hitter. The warhead of the present disclosed multikinase degraders binds about 360 out of 400 tested kinases, showing that they are much more general kinase binders and degraders than any previously reported (J. Am Chem Soc. 2008 Dec. 24; 130(51):17568-74).

DETAILED DESCRIPTION OF PREFERRED EMBODIMENTS

Figure 1:
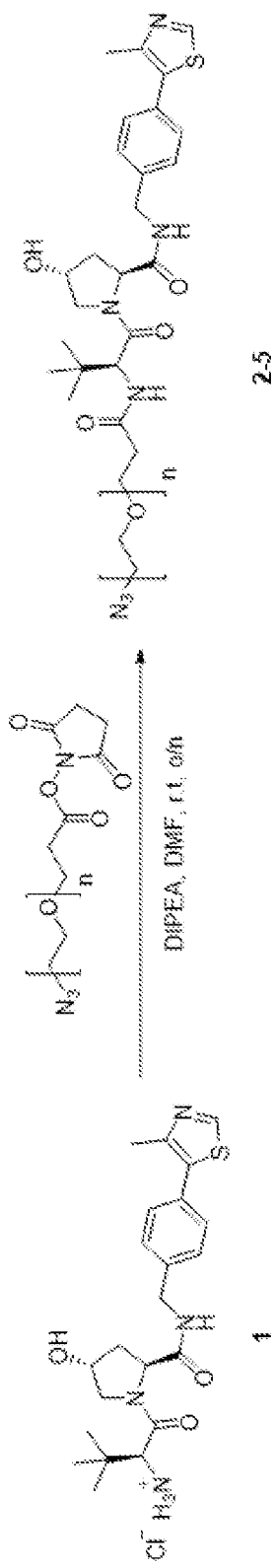
FIG. 1 shows a synthetic scheme for preparing compounds used in the synthesis of preferred embodiments of multikinase degraders described herein.

The present disclosure relates to multikinase degraders.

Preferred embodiments described herein relate to heterobifunctional compounds (PROTACs) that are useful for the modulation of targeted ubiquitination. Also described herein is the synthesis of compounds that contain on one end a ubiquitin E3 ligase ligand binding moiety (ULM), and on the other end a promiscuous kinase ligand that binds a target protein kinase (defined as a protein/polypeptide targeting moiety or PTM group), such that the target protein is in close proximity to the ubiquitin ligase. This leads to the ubiquitination and subsequent degradation (and inhibition) of the target protein. The ULM may be a Von Hippel-Lindau (VHL) E3 ligase ligand or a cereblon E3 ligase recruiter moiety, such as thalidomide, which bind to the VHL or cereblon E3 ubiquitin ligase, respectively.

The respective positions of the PTM and ULM moieties, as well as their number as illustrated herein, is provided by way of example only and is not intended to limit the compounds in any way. As would be understood by the skilled artisan, the bifunctional compounds as described herein can be synthesized such that the number and position of the respective functional moieties can be varied as desired.

The present disclosure further provides, in preferred embodiments, methods of using the bifunctional compounds. The PROTACs can be used as tool compounds to determine which kinases would be degraded by a particular E3 ligase. It has been reported that all target proteins cannot be degraded by a particular E3 ligase (Angew. Chem. Int. Ed., 2016, 55, 807-810). The PTM used in these compounds binds to ~360 kinases (J. Am. Chem. Soc., 2008, 130, 51, 17568-17574). Thus, they can be used to determine if the particular target kinase (~500 known) can be degraded by a particular E3 ligase before developing a more selective degrader for that particular target protein. The compounds can also be used for identifying new kinase drug targets in any functional cell based assays. For example, the disclosed compounds can be tested for cytotoxicity in drug resistant cancer cells. If the cytotoxicity is observed it will be due to the degradation of protein kinases. Subsequent identification of kinases that are degraded by PROTACs in drug resistant cells will identify candidate kinases for which selective degraders can subsequently be designed.

Accordingly, preferred embodiments described herein include multikinase degraders that are comprised of a ubiquitin ligand binding moiety (ULM) and a protein or polypeptide targeting moiety (PTM). In additional preferred embodiments, the ULM comprises a VHL ligand or a thalidomide moiety. In additional preferred embodiments, the PTM comprises a compound having a structure of:

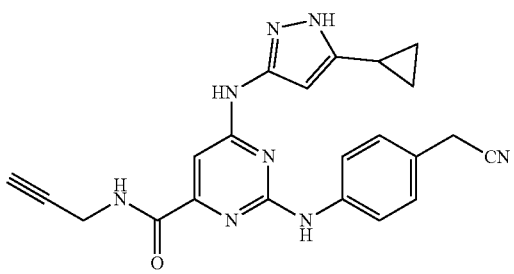

In additional preferred embodiments, the multikinase degrader further comprises polyethylene glycol (PEG), which may have different lengths and which may preferably be included as 1-4 repeating units.

In additional preferred embodiments, the multikinase degrader has a structure of:

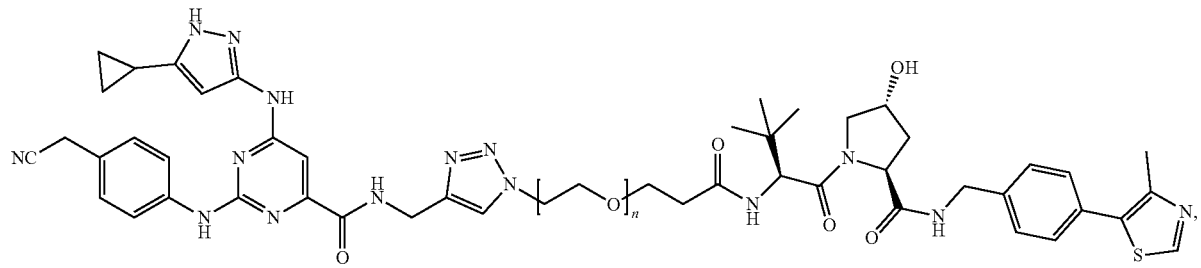

wherein n is 1 to 4.

In additional preferred embodiments, the multikinase degrader has a structure of:

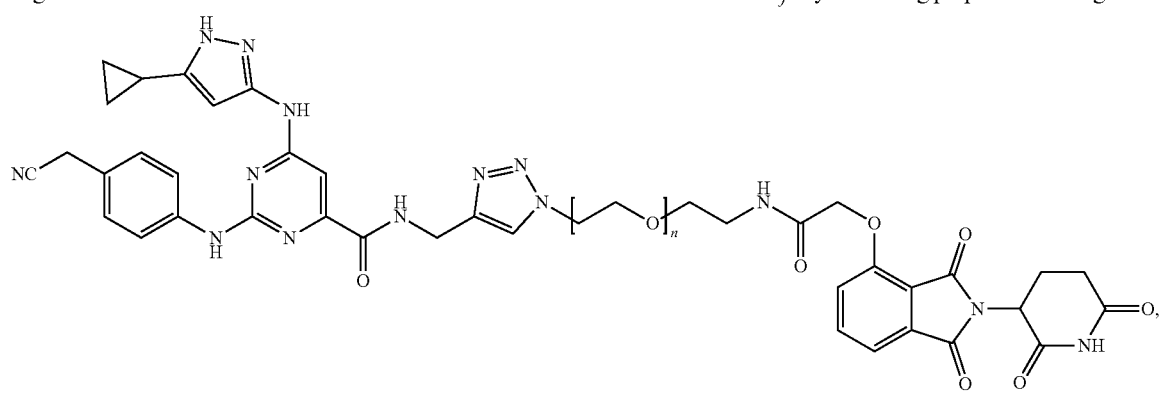

wherein n is 1 to 4.

The exemplary multikinase degraders described herein may occur in different geometric and enantiomeric forms, and both pure forms and mixtures of these separate isomers are included in the scope of this invention, as well as any physiologically functional or pharmacologically acceptable salt derivatives or prodrugs thereof. Production of these alternate forms would be well within the capabilities of one skilled in the art.

The current invention also pertains to methods of determining or identifying a target kinase for therapeutic applications. In preferred embodiments, cells in a cell-based assay are treated with the exemplary multikinase degraders identified in preferred embodiments herein to produce treated cells, then the treated cells are monitored for degradation of kinases in the treated cells. Affected cells are identified amongst the treated cells, where the affected cells have at least one degraded kinase. The one or more degraded kinases in the affected cells are then identified. The degraded kinases are determined to be a target kinase for therapeutic applications. In preferred embodiments, the therapeutic applications comprise treatment or prevention of cancer, an autoinflammatory disorder, or a neurodegenerative disorder.

Further aspects of the present invention will become apparent from the following description given by way of example only.

Example 1

General Experimental Methods. All experiments requiring anhydrous conditions were conducted in flame-dried glassware fitted with rubber septa under a positive pressure of dry nitrogen. Column chromatography was performed on a Combiflash $R_f$+ system using prepacked silica gel columns from Silicycle. An acetone cooling bath was adjusted to the appropriate temperature by the addition of small portions of dry ice.

Instrumentation. MALDI were obtained in a Voyager DE Pro system from Applied Biosystems at U of H. HPLC purification was conducted with an Agilent 218 Injection pump coupled with a Varian-ProStar 325 detector and a Restek Pinnacle DB $C_{18}$ column (250×21.2 mm, 5 μm).

Materials. Reagents were purchased from Aldrich Chemical Co., Sigma Chemical Co. or Combi Blocks and were used without further purification. 1 was bought as a HCl salt from Chemshuttle (Catalog no. 133776). Azido-PEG-NHS esters and Azido-PEG-amines were bought from BroadPharm. 6 was prepared following previous literature procedures (Remillard, D.; Bradner, *J. Angew Chem. Intl Ed.*, 2017, 56, 5738-5743).

FIG. 1 shows a synthetic scheme for preparing compounds used in the synthesis of preferred embodiments of multikinase degraders described herein. To a stirred solution containing 1 in DMF was added DIPEA (1.5 eq.) and Azido-PEG(1-4)-NHS ester (1.5 eq.) respectively. The reaction mixture was stirred at r.t overnight under nitrogen atmosphere and was diluted with 10 mL of ice-cold water. The aqueous layer was extracted with two 10-mL portions of ethyl acetate. The combined organic layer was dried over anhydrous $MgSO_4$, filtered and concentrated under diminished pressure. The residue was dissolved in 1:1 wateracetonitrile and was purified by $C_{18}$ reversed phase HPLC using a gradient of 0% to 100% acetonitrile containing 0.1% TFA in water containing 0.1% TFA over a period of 20 minutes. The fractions eluting between 16.5 and 17 min were collected and lyophilized to afford 2-5 as white solids.

Azido-PEG$_1$-VHL (2): yield 48 mg (70%):

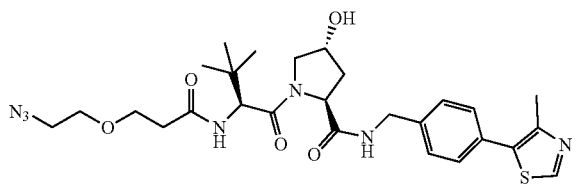

2

Azido-PEG$_2$-VHL (3): yield 20 mg (60%):

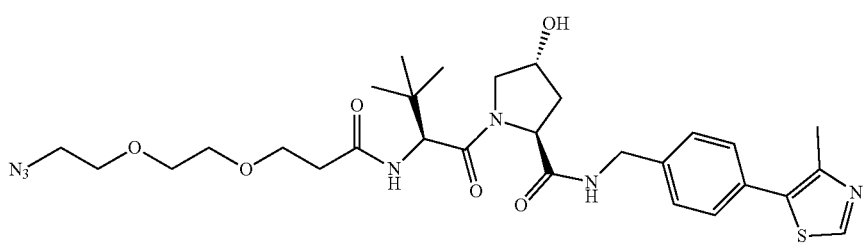

3

Azido-PEG$_4$-VHL (4): yield 105 mg (67%):

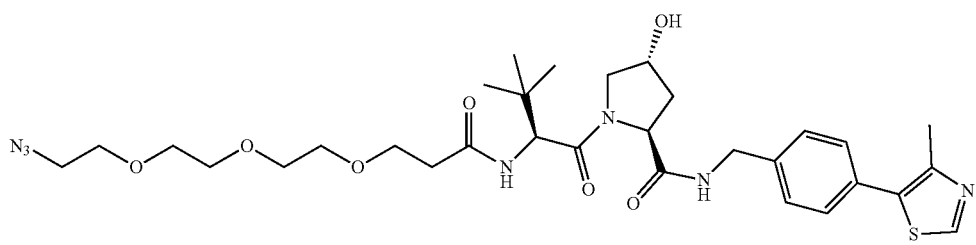

4

Azido-PEG$_4$-VHL (4): yield 105 mg (65%)

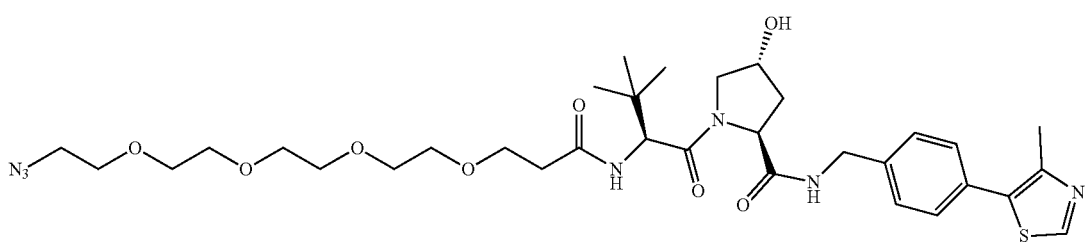

5

Figure 2:
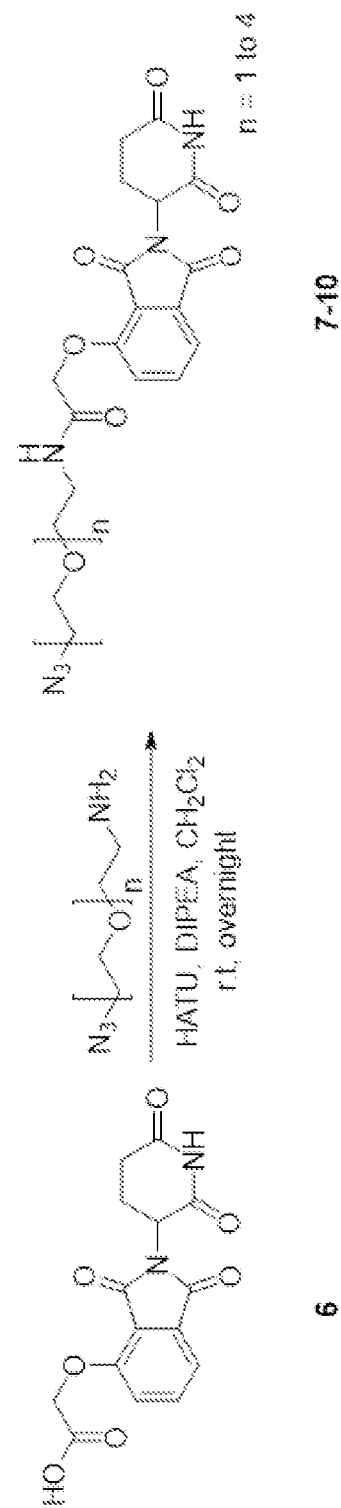
FIG. 2 shows a synthetic scheme for preparing compounds used in the synthesis of preferred embodiments of multikinase degraders described herein.

FIG. 2 shows a synthetic scheme for preparing compounds used in the synthesis of preferred embodiments of multikinase degraders described herein. To a stirred suspension containing 6 in anhydrous CH$_2$Cl$_2$ was added DIPEA (3 eq.) and HATU (1.1 eq.) respectively. The reaction mixture was stirred at r.t for 15 min and Azido-PEG(1-4)-amine (1.1 eq.) was added dropwise. The yellow reaction mixture was stirred overnight at r.t under nitrogen atmosphere. The reaction mixture was diluted with 10 mL of ice-cold water. The aqueous layer was extracted with three 10-mL portions of ethyl acetate. The combined organic layer was dried over anhydrous MgSO$_4$, filtered and concentrated under diminished pressure. The residue was purified first on a silica gel column using dichloromethane-methanol followed by on C$_{18}$ reverse phase HPLC using a gradient of 0% to 100% acetonitrile in water over a period of 20 min.

Azido-PEG$_1$-thalidomide (7): yield 30 mg (50%):

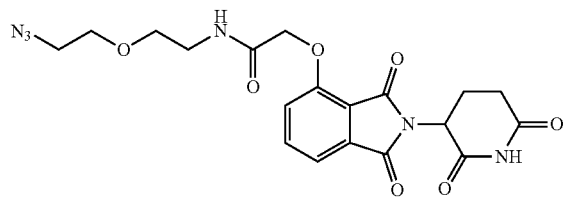

Azido-PEG$_2$-thalidomide (8): yield 20 mg (46%):

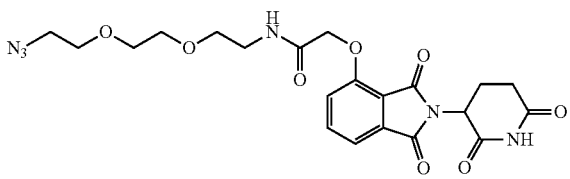

Azido-PEG$_3$-thalidomide (9): yield 27 mg (60%):

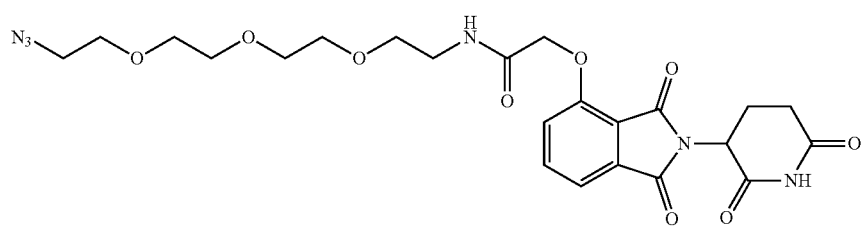

Azido-PEG$_4$-thalidomide (10): yield 26 mg (67%):

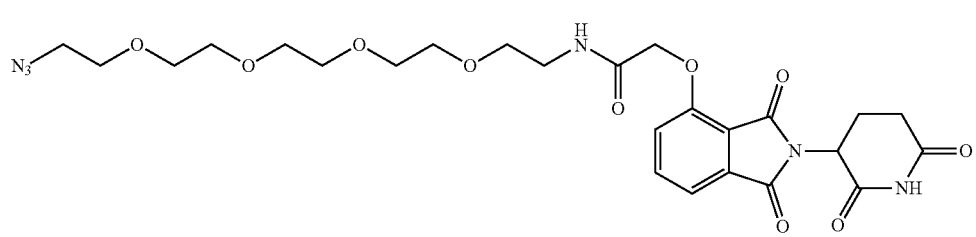

Figure 3:
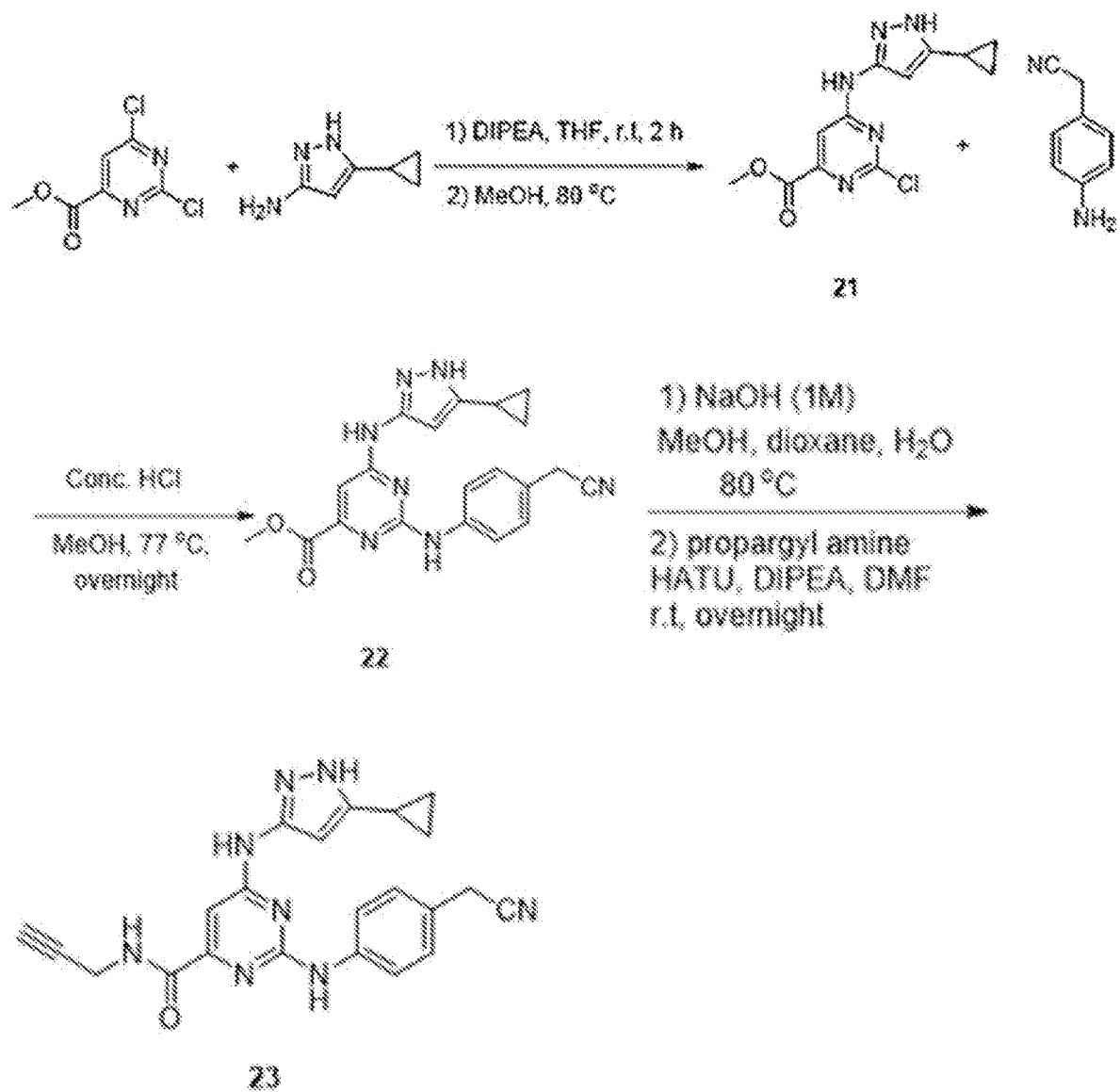
FIG. 3 shows a synthetic scheme for preparing compounds used in the synthesis of preferred embodiments of multikinase degraders described herein.

FIG. 3 shows a synthetic scheme for preparing compounds used in the synthesis of preferred embodiments of multikinase degraders described herein. For compound 21, to a solution of Methylester of 2,4-dichloropyrimidine (12.1 mmol) in 15 mL anhydrous THF at 0° C. was added 3-Amino-5-cyclopropyl-1H-pyrazole (12.2 mmol) and DIPEA (3.74 mmol) in 15 mL anhydrous THF and the reaction mixture was stirred at r.t for 2 h. The solvents were evaporated in vacuo, and the residue was heated in methanol (15 mL) at 80° C. for 1 h. The mixture was cooled to r.t and filtered. The precipitate was dried overnight to obtain a yellow powder 21: yield 2.53 g (71%).

Compound 22:

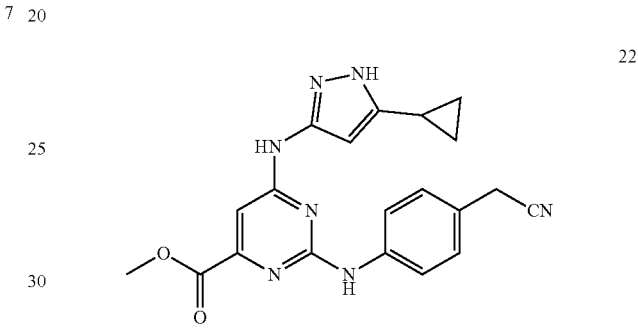

To a suspension of 21 (0.5 g, 1.7 mmol) and 2-(4-aminophenyl)acetonitrile (0.22 g, 1.7 mmol) in 6 mL MeOH was added 0.3 mL of conc. HCl. The reaction mixture was heated at 93° C. overnight. The reaction mixture was cooled to r.t and filtered. The yellow precipitate was dried to obtain 22 as a yellow solid: yield 0.34 g (51%).

Compound 23:

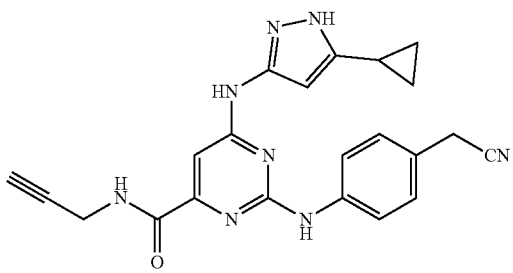

To a stirred solution containing 50 mg of 22 in 5 mL of 2:1:2 MeOH, 1,4-dioxane and water at 77° C. was added 1 M NaOH dropwise until TLC indicated complete consumption of starting material. The intense yellow mixture was cooled to r.t and acidified with 2 M HCl until pH~2, a white precipitate appeared. The mixture was concentrated. The crude was again suspended in 1:1 water-acetonitrile and lyophilized to obtain a yellowish white powder. The crude was used in the next step without further purification. To the crude was added 2 mL of anhydrous DMF followed by DIPEA (80 ul) and HATU (64 mg) at r.t. The suspension was stirred at r.t for 15 min and propargyl amine (10 mg) was added dropwise. The mixture was stirred at r.t overnight. The reaction mixture was diluted with 50 mL ice-cold water. The aqueous layer was extracted with two 25-mL portions of ethyl acetate. The combined organic layer was dried over anhydrous MgSO$_4$, filtered and concentrated. The crude was suspended in 10 mL of ethyl acetate and filtered to obtain 23 as a yellowish white solid: yield 28 mg (52%).

Figure 4:
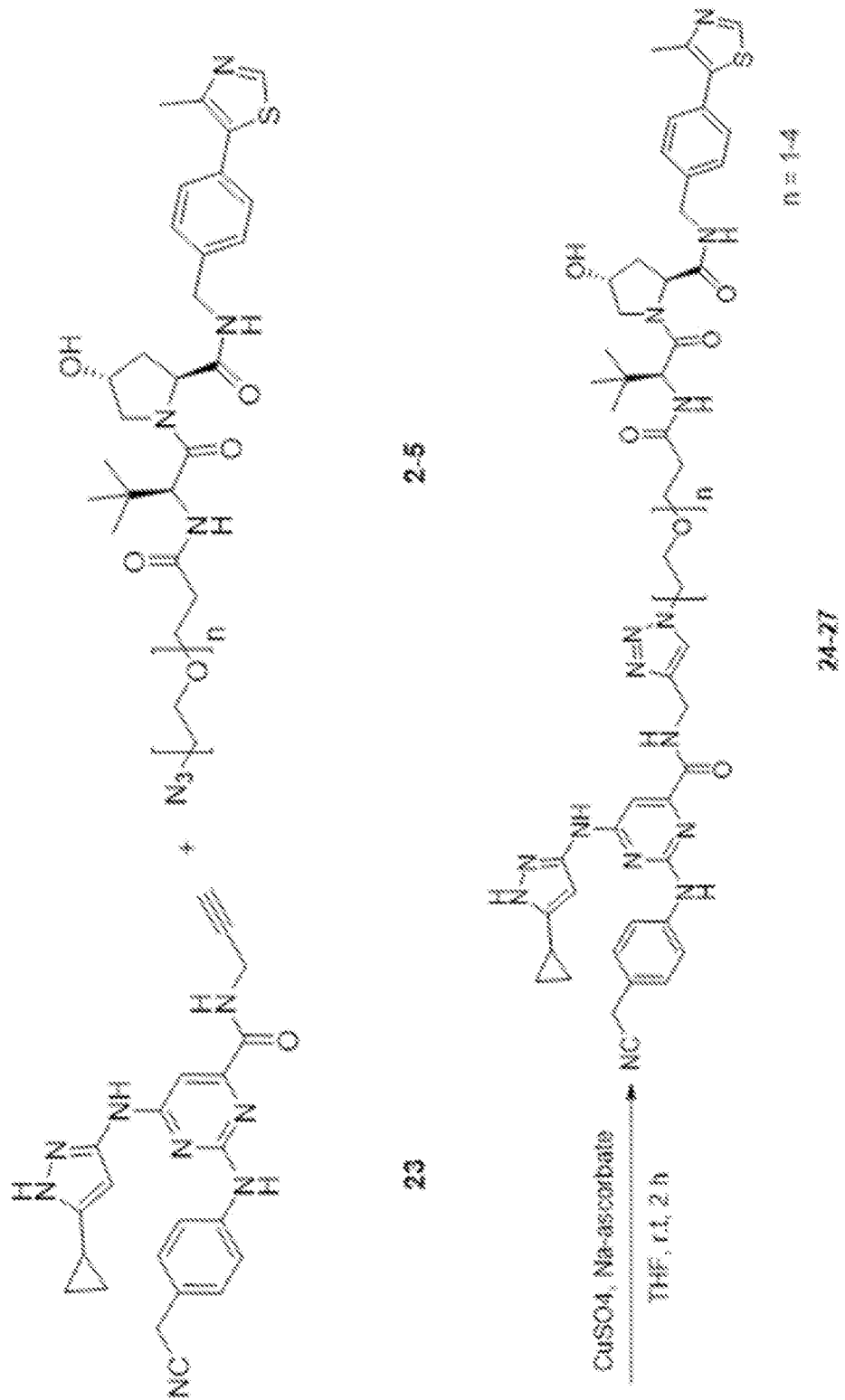
FIG. 4 shows a synthetic scheme for preparing preferred embodiments of multikinase degraders described herein.

FIG. 4 shows a synthetic scheme for preparing preferred embodiments of multikinase degraders described herein. 23 and 2-5 were dissolved in 0.5 mL THF. To this solution were added 15 uL of 1 M CuSO$_4$ followed by 15 uL of 1 M Na-ascorbate. The reaction mixture was stirred for 1 h at r.t. An additional 15 uL of both CuSO$_4$ and Na-ascorbate were added to the reaction mixture and stirred for 1 h. The completion of the reaction was monitored by C$_{18}$ TLC using 1:1 water-acetonitrile as the mobile phase. The reaction mixture was concentrated under diminished pressure. The crude was redissolved in 1:1 water-acetonitrile and purified on Cis-reversed phase HPLC (250×21.2 mm) using a gradient of 0 to 100% acetonitrile containing 0.1% TFA in water containing 0.1% TFA over a period of 20 min. The desired fractions from 16.5 to 17.5 min were collected and lyophilized to obtain white solids.

23-PEG$_1$-VHL (24): yield—11 mg (50%); mass spectrum (MALDI) m/z 984.74 (M+H)$^+$:

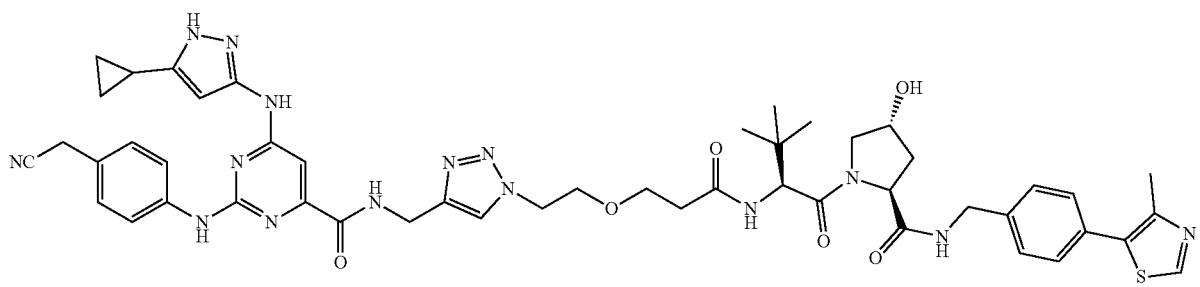

23-PEG$_2$-VHL (25): yield—13.5 mg (45%); mass spectrum (MALDI) m/z 1029.21 (M+H)$^+$:

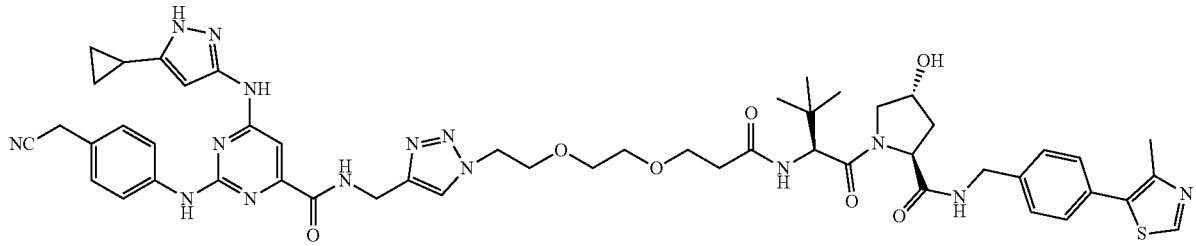

23-PEG₃-VHL (26): yield—13.5 mg (59%); mass spectrum (MALDI) m/z 1072.49 (M+H)⁺:

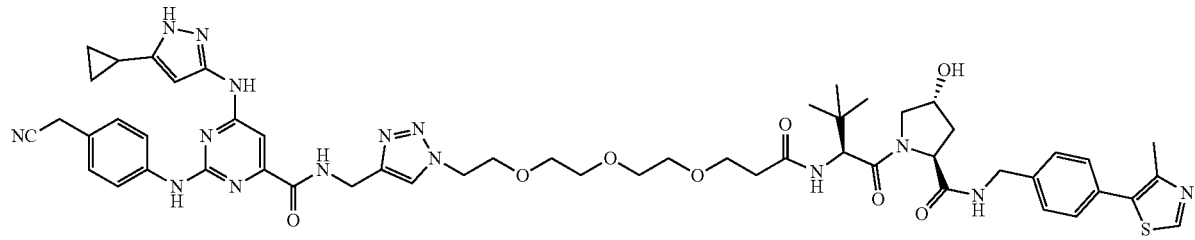

26

23-PEG₄-VHL (27): yield—15 mg (59%); mass spectrum (MALDI) m/z 1116.51 (M+H)⁺:

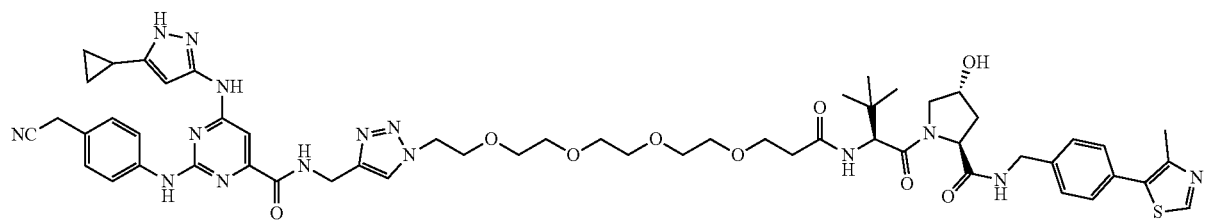

27

Figure 5:
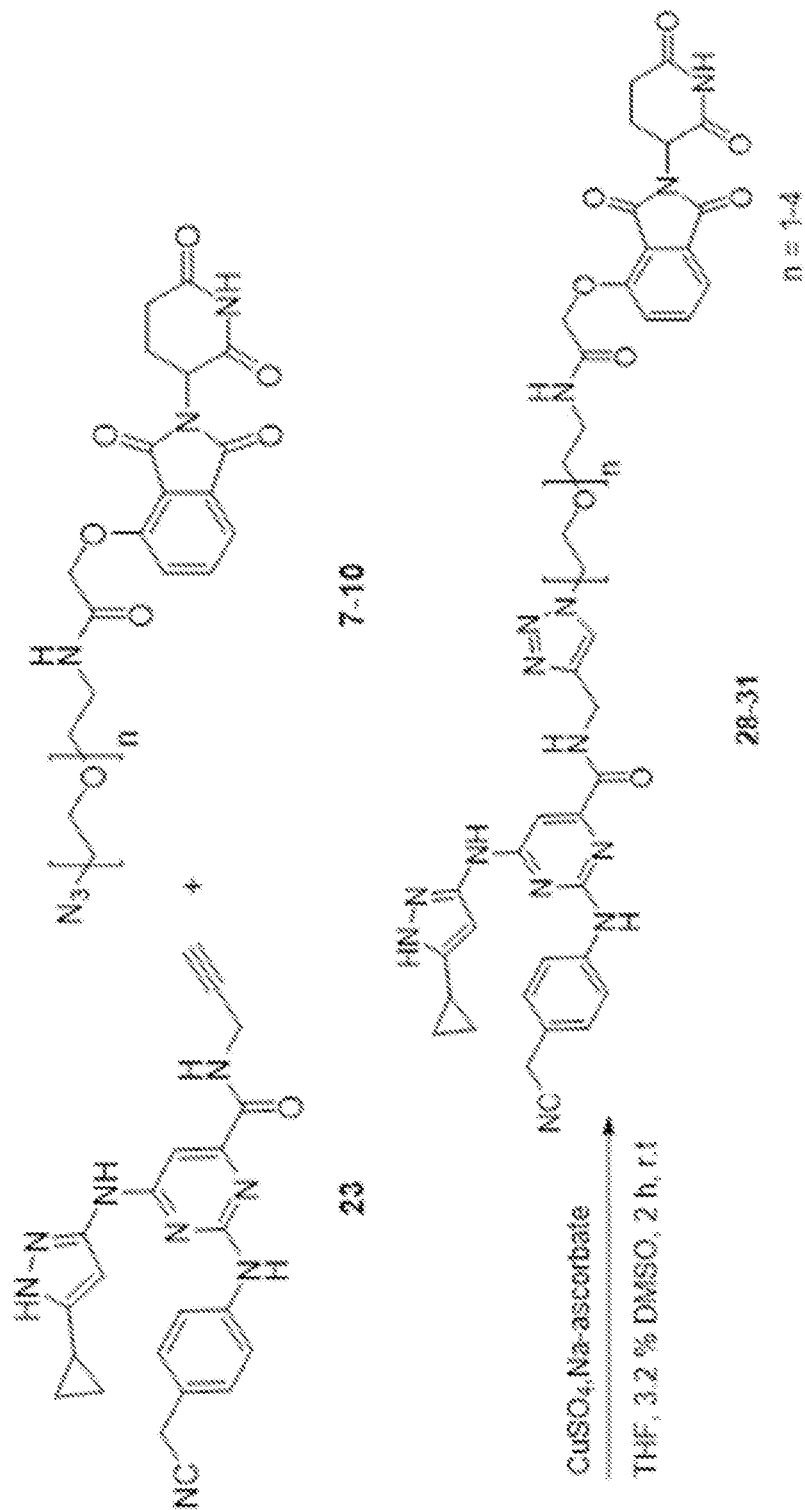
FIG. 5 shows a synthetic scheme for preparing preferred embodiments of multikinase degraders described herein.

FIG. 5 shows a synthetic scheme for preparing preferred embodiments of multikinase degraders described herein. 23 and 7-10 were dissolved in 0.5 mL THF. To this solution were added 15 μL of 1 M CuSO₄ followed by 15 μL of 1 M Na-ascorbate. The reaction mixture was stirred for 1 h at r.t. An additional 15 μL of both CuSO₄ and Na-ascorbate were added to the reaction mixture and stirred for 1 h. The completion of the reaction was monitored by C₁₈ TLC using 1:1 water-acetonitrile as the mobile phase. The reaction mixture was concentrated under diminished pressure. The crude was redissolved in 1:1 water-acetonitrile and purified on Cis-reversed phase HPLC (250×21.2 mm) using a gradient of 0 to 100% acetonitrile in water over a period of 20 min. The desired fractions from 16.5 to 17.5 min were collected and lyophilized to obtain white solids.

23-PEG₁-thalidomide (28): yield—6.0 mg (40%); mass spectrum (MALDI) m/z 857.32 (M+H)⁺:

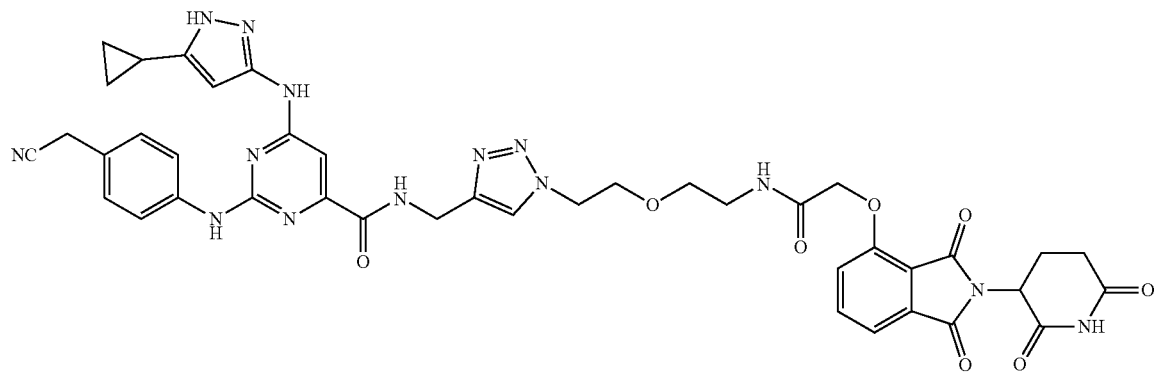

28

23-PEG₂-thalidomide (29): yield—5.7 mg (35%); mass spectrum (MALDI) m/z 900.34 (M+H)⁺:

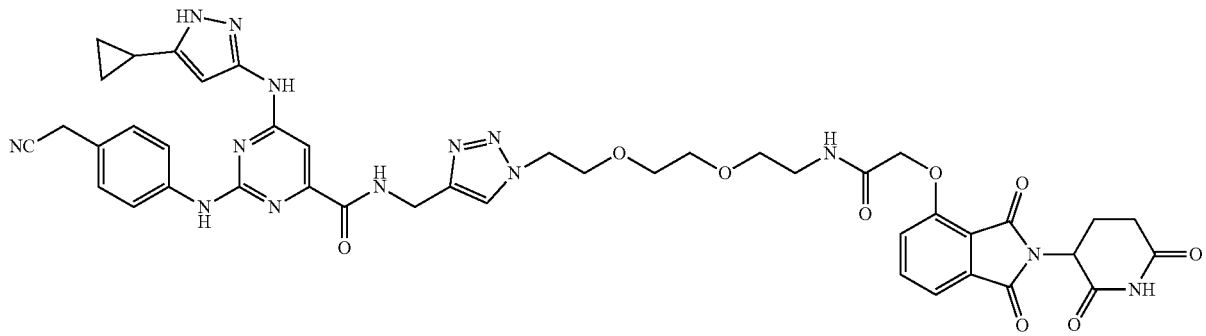

23-PEG₃-thalidomide (30): yield—7.0 mg (37%); mass spectrum (MALDI) m/z 945.37 (M+H)⁺:

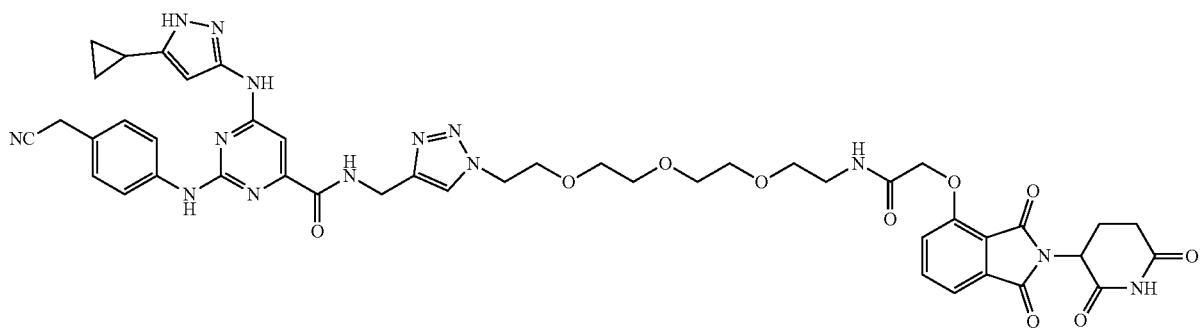

23-PEG₄-thalidomide (31): yield—5.5 mg (28%); mass spectrum (MALDI) m/z 989.39 (M+H)⁺:

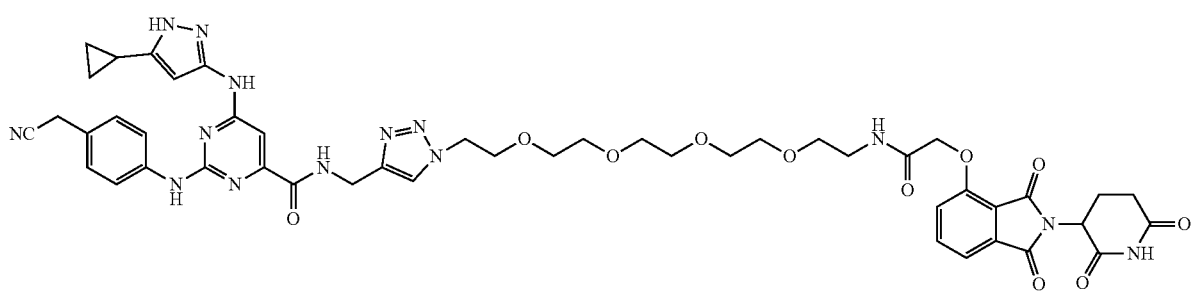

Example 2

Figure 6:
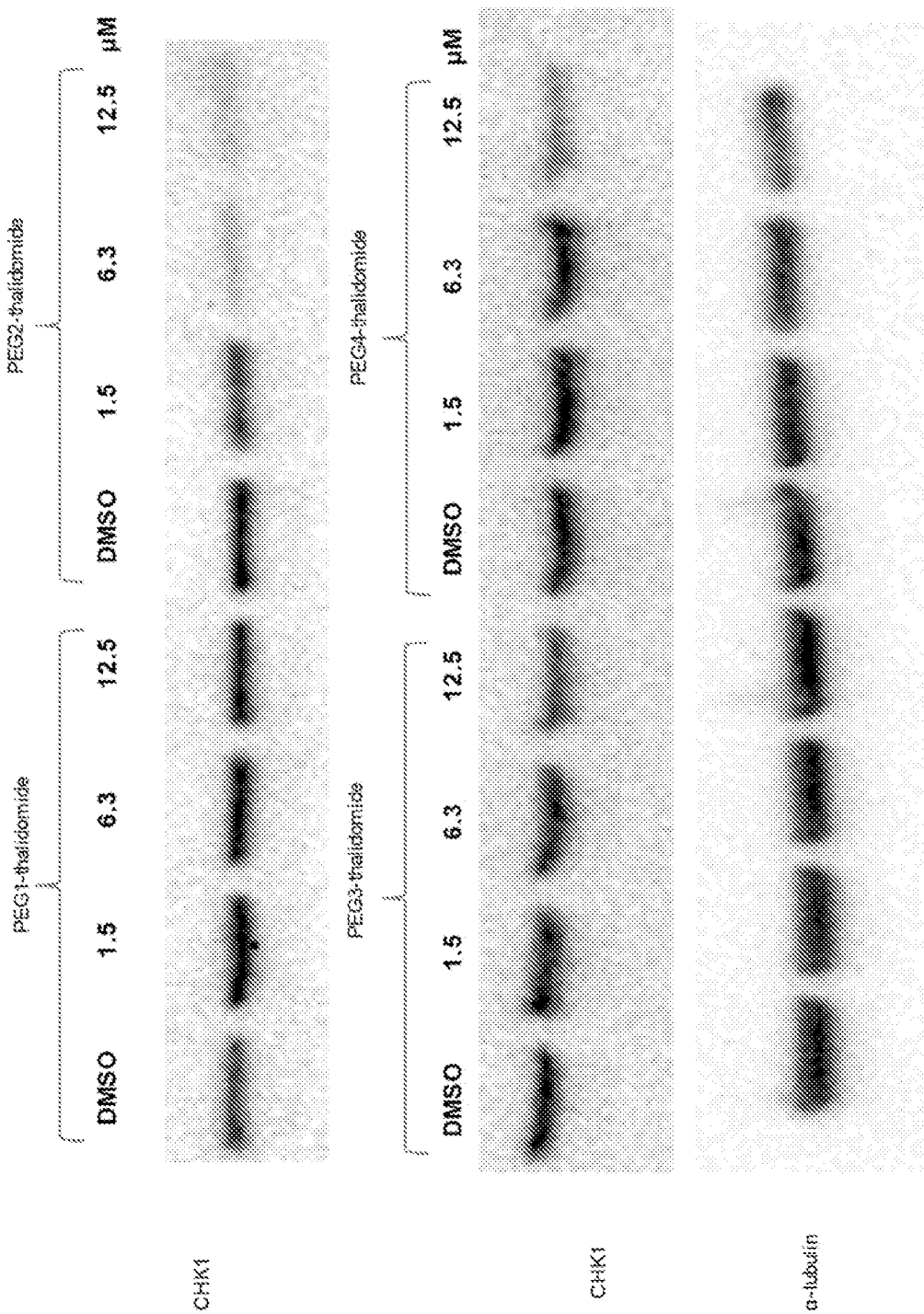
FIG. 6 shows the effect of multikinase degraders (PEG1-4 thalidomide) on CHK1 kinase in A375 melanoma cell line.

Tests were performed to determine the activity of the exemplary PROTACs PEG1-thalidomide, PEG2-thalidomide, PEG3-thalidomide, and PEG4-thalidomide having the structures shown above. Human A375 malignant melanoma cells were obtained from American Type Culture Collection ATCC) and cultured according to ATCC protocols. Subsequently cells were treated with the PROTACs for 18 h at 37° C. and 5% CO₂. Subsequently cells were harvested and lysed using commercially available lysis buffer (Biorad) containing Roche cOmplete™ Protease Inhibitor Cocktail tablets. The amount of degraded proteins were probed with specific antibodies purchased from Cell Signaling in western blotting. α-Tubulin was used as the loading control. FIG. 6 shows degradation of CHK1 kinase with PEG2-thalidomide and PEG4-thalidomide degraders, demonstrating that PEG2-thalidomide and PEG4-thalidomide degrade the protein CHK1.

Figure 7A:
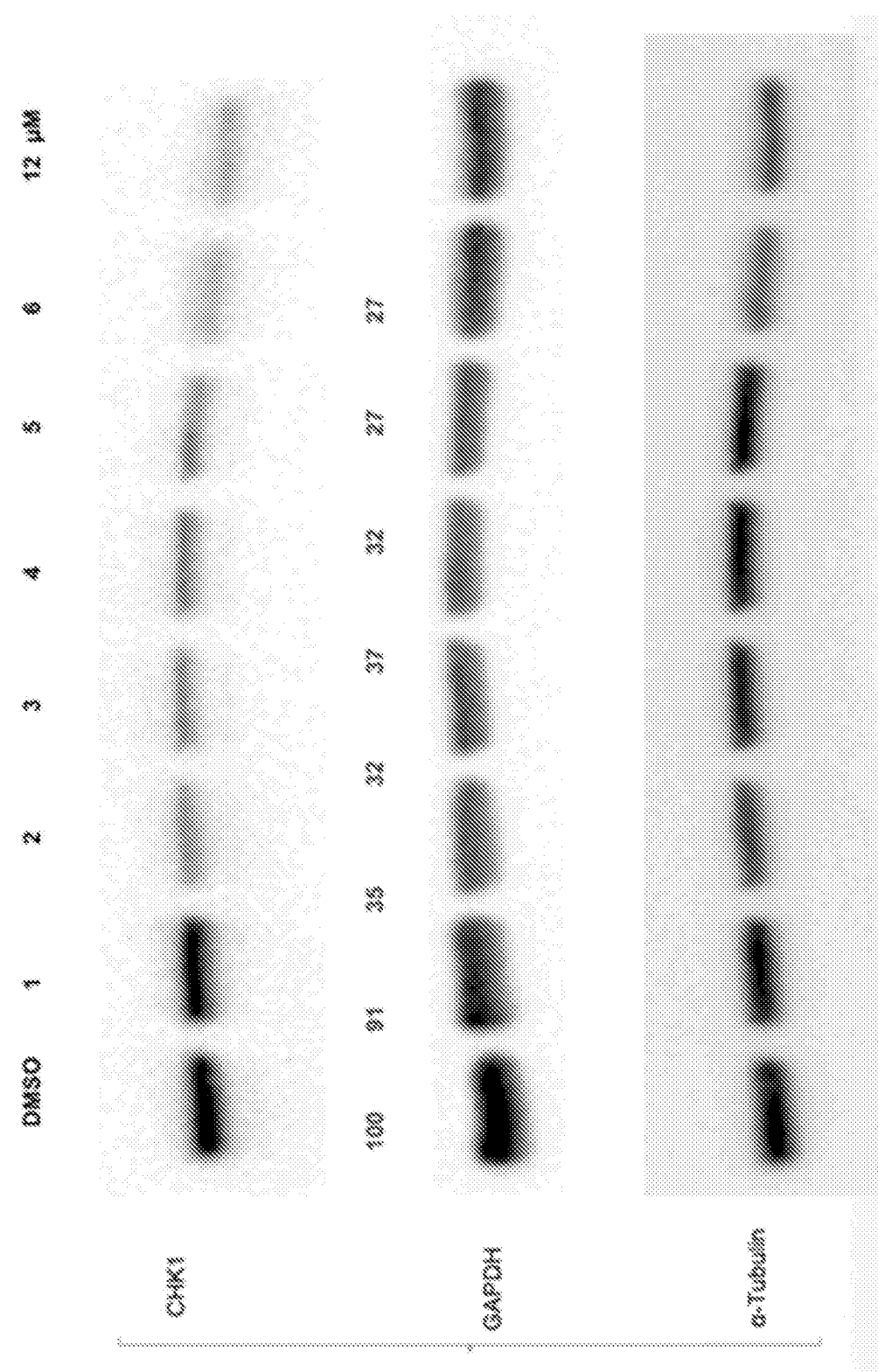
FIG. 7 shows (A) the dose response of an exemplary degrader (PEG2-thalidomide) on CHK1 degradation in A375 melanoma cell line, (B) bar graph representing quantification of CHK1 degradation in (A), (C) dose response curve of CHK1 degradation by exemplary degrader PEG2-thalidomide in (A), showing $DC_{50}$ values.
Figure 7B:
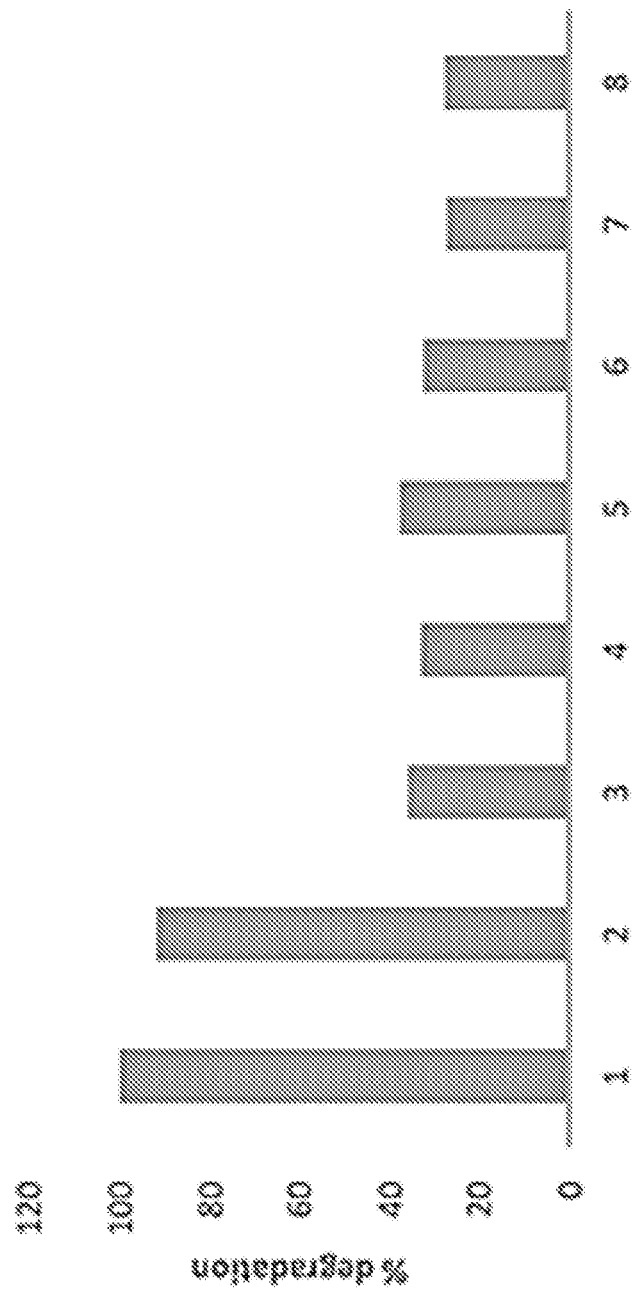

In further tests, human A375 malignant melanoma cells were treated with PEG2-thalidomide at different concentrations for 12 h at 37° C. and 5% CO₂. Proteins CHK1, GAPDH, and α-Tubulin were probed by specific antibodies. GAPDH and α-Tubulin were used as the loading control. FIG. 7A shows the dose response of degradation of CHK1 by PEG2-thalidomide, demonstrating its degradation. FIG.

Figure 7C:
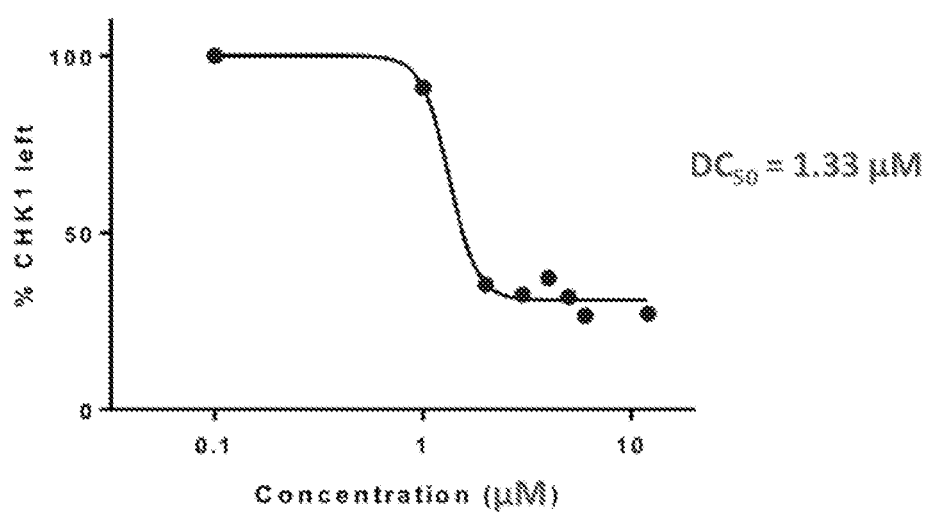

7B shows a bar graph quantification of 7A. FIG. 7C shows a dose response curve of PEG2-thalidomide degrading CHK1. Cell culture conditions, lysis and western blotting were performed similar to above.

Figure 8A:
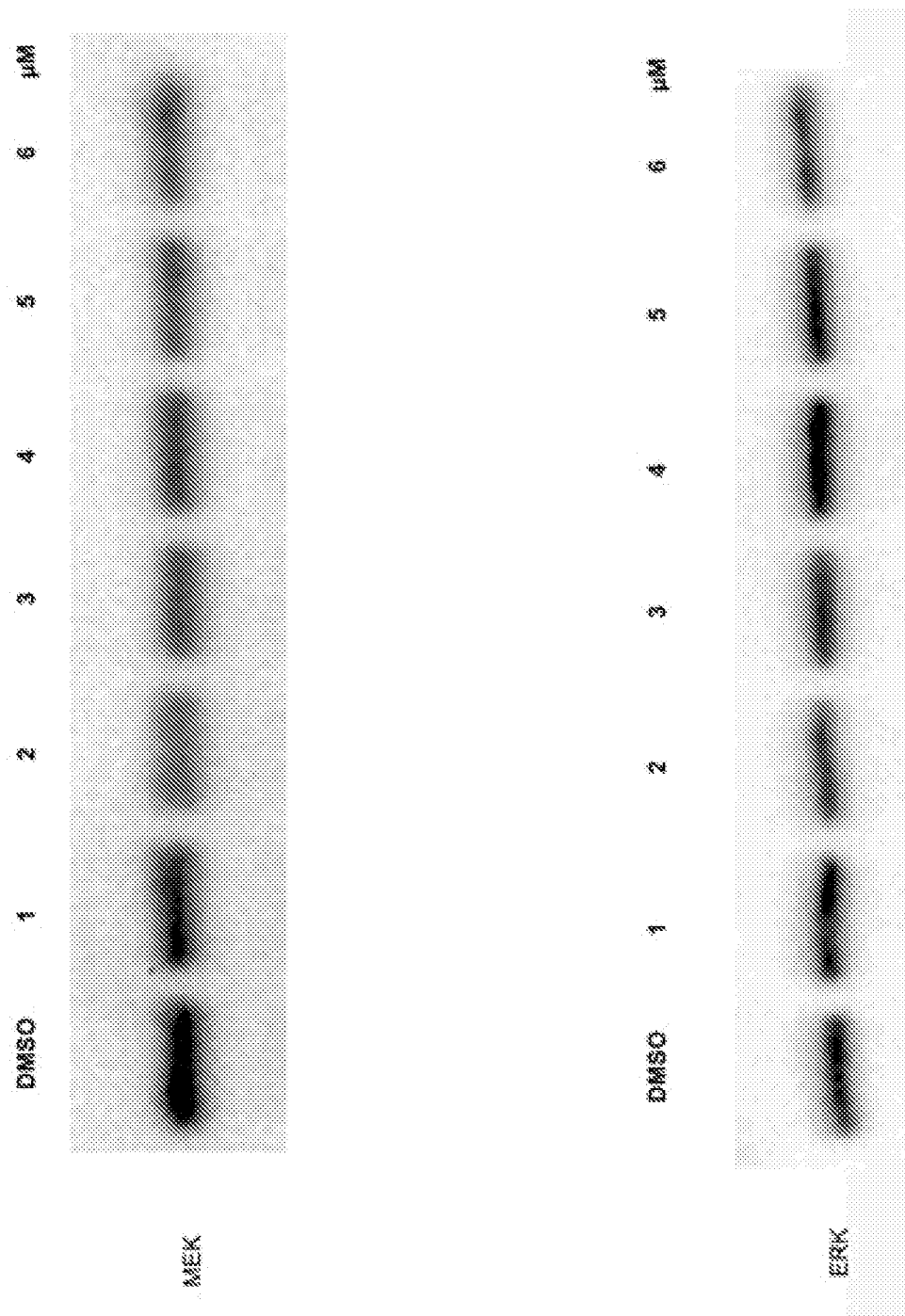
FIG. 8 shows (A) the effect of exemplary degrader PEG2-thalidomide on kinases MEK and ERK, (B) bar graph representing quantification of the effect of exemplary degrader PEG2-thalidomide on MEK kinase, (C) bar graph representing quantification of the effect of exemplary degrader PEG2-thalidomide on ERK kinase.
Figure 8B:
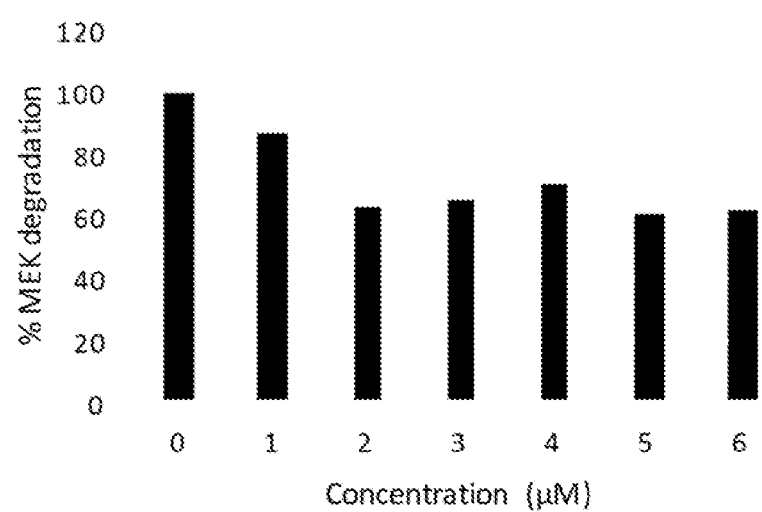
Figure 8C:
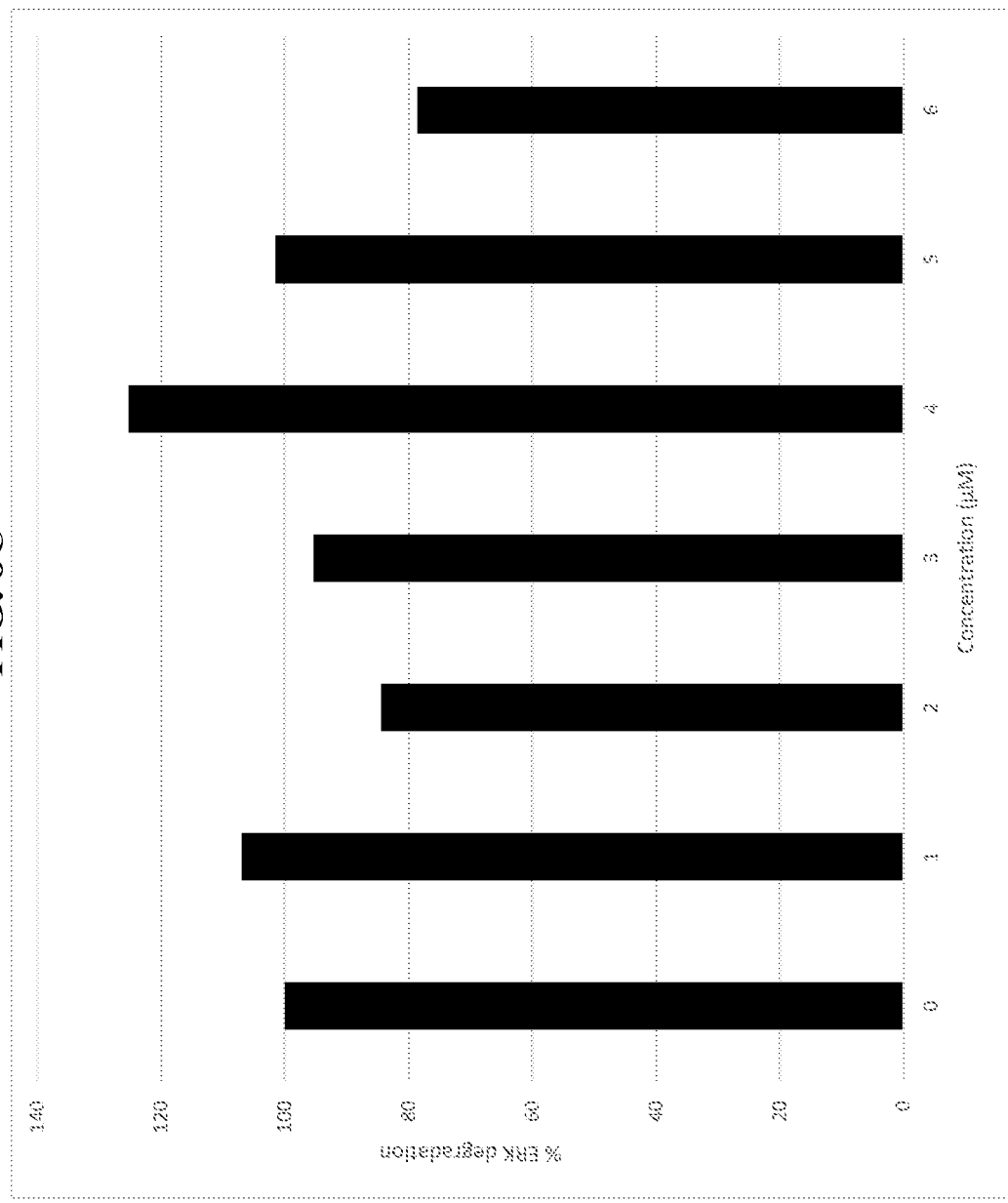
Figure 9:
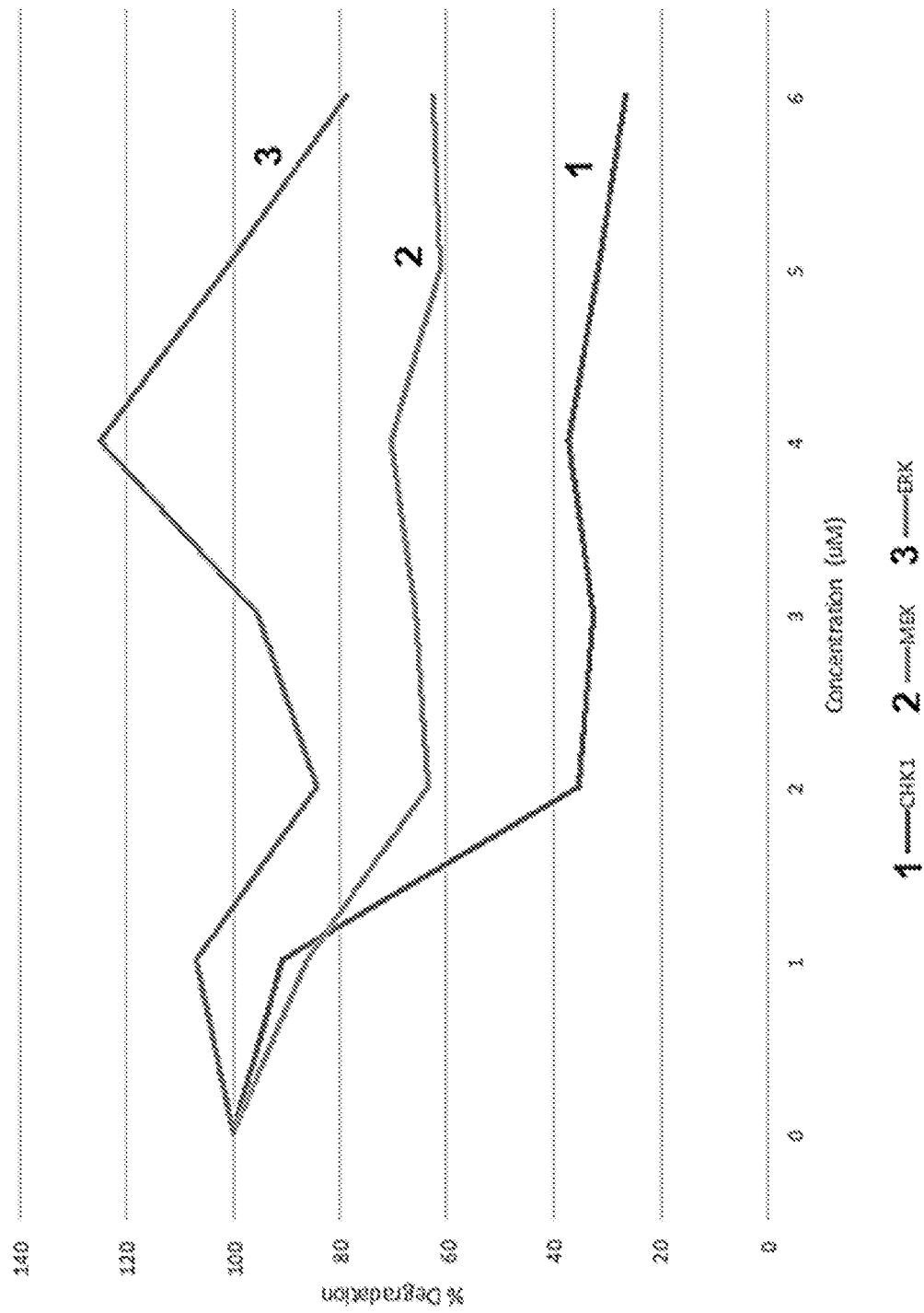
FIG. 9 shows the combined data of kinase CHK1, MEK and ERK degradation by exemplary degrader PEG2-thalidomide.

In further tests, the effect of PEG2-Thalidomide degrader on cell viability was tested. Human A375 malignant melanoma cells were treated with PEG2-thalidomide for 12 h at 37° C. and 5% $CO_2$. Proteins MEK and ERK were probed by specific antibodies. The procedure used was similar to the one outlined above. FIG. 8A shows degradation of MEK and ERK kinase with PEG2-thalidomide degrader, demonstrating the degradation of MEK but not ERK by PEG2-thalidomide. FIG. 8B shows a bar quantification of MEK degradation by PEG2-thalidomide. FIG. 8C shows a bar quantification of ERK degradation by PEG2-thalidomide. FIG. 9 shows the combined quantified dose response data from 7B, 8B, and 8C.

Figure 10:
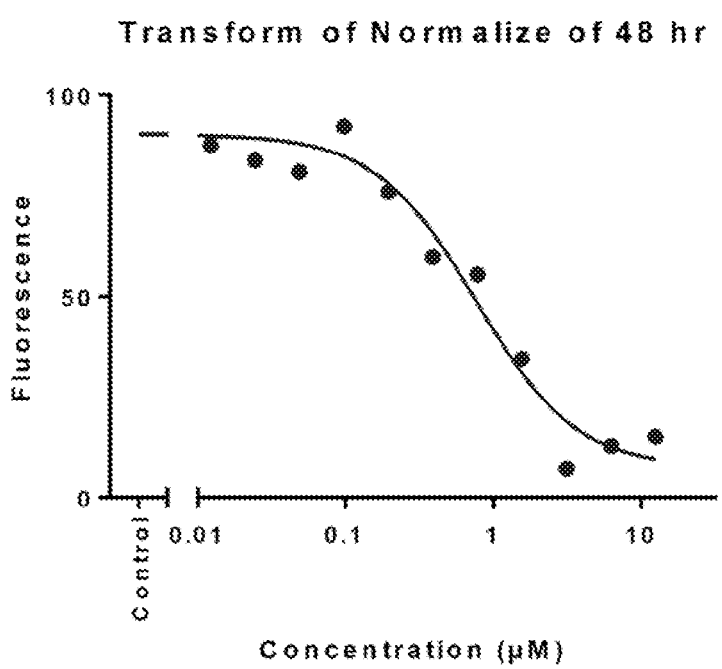
FIG. 10 shows the effect of exemplary degrader PEG2-thalidomide on the viability of A375 melanoma cell line after 48 h treatment.

In further tests, human A375 malignant melanoma cells were treated with PEG2-thalidomide for 48 h at 37° C. and 5% $CO_2$. Subsequently, the viability of A375 malignant melanoma cells was checked using CellTiter Glo assay (Promega) in 384 well plates, and the luminescence signal was quantified using Biotek H1 plate reader. FIG. 10 shows a dose response curve of the effect of PEG2-thalidomide on the viability of A375 malignant melanoma cells, providing the $IC_{50}$ values of 768 nM.

What is claimed is:

1. A multikinase degrader having a structure of:

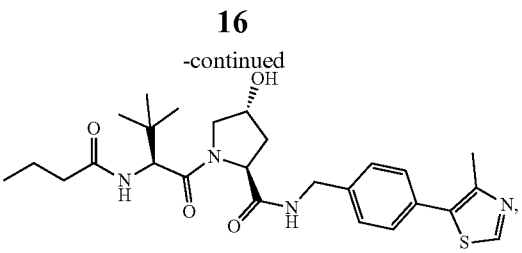

wherein n is 1 to 4.

2. A method for determining a target kinase for therapeutic applications, comprising:
   treating cells in an assay with the multikinase degrader of claim 1 to produce treated cells;
   monitoring degradation of kinases in the treated cells;
   identifying affected cells in the treated cells, wherein the affected cells have at least one degraded kinase; and
   identifying the degraded kinase in the affected cells, wherein the degraded kinase is determined to be a target kinase for therapeutic applications.

3. The method of claim 2, wherein the therapeutic applications comprise treatment or prevention of cancer, an autoinflammatory disorder, or a neurodegenerative disorder.

4. A multikinase degrader having a structure of:

wherein n is 1 to 4.

5. A method for determining a target kinase for therapeutic applications, comprising:
   treating cells in an assay with the multikinase degrader of claim 4 to produce treated cells;
   monitoring degradation of kinases in the treated cells;
   identifying affected cells in the treated cells, wherein the affected cells have at least one degraded kinase; and
   identifying the degraded kinase in the affected cells, wherein the degraded kinase is determined to be a target kinase for therapeutic applications.

6. The method of claim 5, wherein the therapeutic applications comprise treatment or prevention of cancer, an autoinflammatory disorder, or a neurodegenerative disorder.

* * * * *